United States Patent [19]

Herwegh et al.

[11] 4,393,558
[45] Jul. 19, 1983

[54] FASTENER FOR SHEET MATERIAL

[75] Inventors: Karl J. Herwegh; Rutger Modderkolk, both of Eerbeek, Netherlands

[73] Assignee: Nederlandse Pillo-Pak Maatschappij B.V., Eerbeek, Netherlands

[21] Appl. No.: 273,334

[22] Filed: Jun. 15, 1981

[30] Foreign Application Priority Data

Jun. 28, 1980 [DE] Fed. Rep. of Germany ....... 3024471

[51] Int. Cl.$^3$ ............................................. A44B 19/00
[52] U.S. Cl. .................................... 24/230 R; 24/138; 40/156
[58] Field of Search ................... 24/217, 230 R, 138 R

[56]  References Cited
U.S. PATENT DOCUMENTS 1,208,601 12/1916 Manahan ................................ 24/217
3,638,285  2/1972 Sanchez Giraldez ................ 24/217
3,748,700  7/1973 Willey ..................................... 24/217

FOREIGN PATENT DOCUMENTS 531074 10/1956 Canada .................................. 24/230

Primary Examiner—Gene Mancene
Assistant Examiner—Wenceslao J. Contreras
Attorney, Agent, or Firm—Young & Thompson

[57] ABSTRACT

A fastener for a detachable mounting of flexible sheets, comprises a pair of molded members of synthetic resin which are detachably interconnectible to each other with the sheet gripped between them. One molded member is the base part and is adapted to be attached to a substrate and has an outstanding spike for passing through the sheet. The spike has a cylindrical stem, an annular flange, and a conical spike tip at its outer end. The other molded member is a slip-on member comprising a two-legged clamping fork, the legs having a least internal spacing from each other which is less than the diameter of the cylindrical stem of the other member, and a plurality of pairs of opposed recesses disposed along the confronting edges of the legs. Also, the thickness of the forked member tapers and is least at its free end. Thus, when sheet material is impaled on the spike, the forked member can then be slid over the sheet material with the legs embracing the stem of the spike, the stem of the spike snapping into successive pairs of opposed recesses until the flange on the spike and the thickness of the grasped sheet material, prevent further movement of the forked member.

7 Claims, 9 Drawing Figures

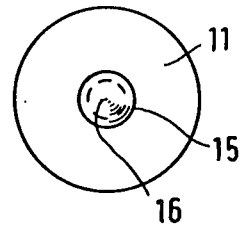
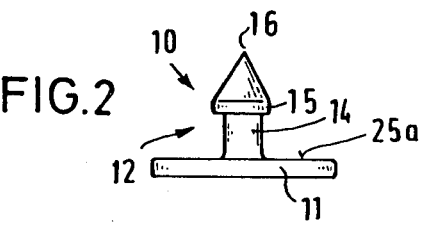
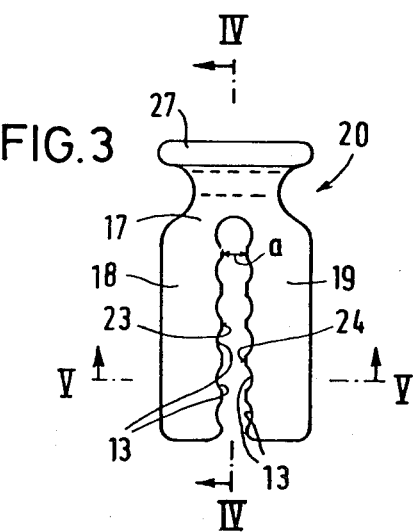
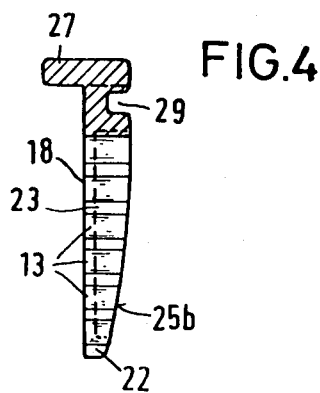
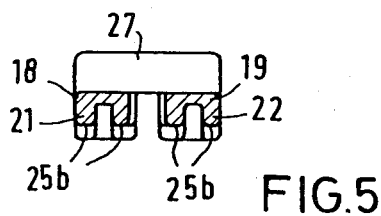

FASTENER FOR SHEET MATERIAL

This invention relates to a sheet-fastening installation suitable for the detachable mounting of flexible synthetic resin sheets serving as thermal insulation or as a windscreen, especially for walls or roofs of greenhouses, comprising a plurality of molded members, connectible in pairs with each other, clamping the sheet between them, wherein one molded member is to be attached as the base part to the substrate and the other molded member can be mounted thereon, and wherein a spike for passing through the sheet extends axially of the base part beyond the clamping surface.

It is known that synthetic resin sheets have excellent thermal insulating properties because they are practically air-impermeable and have a low heat transfer coefficient. This is even more true for the conventional so-called blister-type sheets or air-cushion sheets which are laminated materials of synthetic resin sheets with air cushions incorporated therein and sealed against the ambient atmosphere. It is difficult to mount synthetic resin sheets on substrates to be insulated so that, on the one hand, the sheets are firmly fastened essentially without tension and safe from tearing and are not loosened or ripped off by external influences, such as wind and weather, but, on the other hand, can be detached without damage, if necessary, and optionally be reattached, while keeping the amount of work required for mounting, loosening, and detaching of the sheet at a minimum.

Conventional cable bracing means, which retain the synthetic resin sheets with clips, hooks, or clamps normally are not tear-resistant and show little resistance to strong winds and can be attached only with considerable expenditure of work, particularly across relatively large areas. Conventional clamping rails wherein synthetic resin sheets are held with appropriate clamping profiles cannot be mounted as desired on any kind of substrate, especially on glass surfaces, which also holds true for the conventional magnetic mounting means. Conventional devices for the joining of panel-type materials, as they are described, for example, in DOS (i.e. German Unexamined Laid-Open Application) No. 2,456,505, wherein the panel-type material is braced between two bars provided with extensions and corresponding recesses, are detachable, but cannot be reused once detached, since the extensions must be mechanically severed in order to release the bond. Besides, such a known installation is unsuitable for the external insulation of greenhouses and the like. In conventional means of the type described in German Utility Model No. 7,518,031, serving for the attachment of correspondingly profiled sheet-metal parts, the technical relationships are so different from those in the case of a detachable mounting for flexible synthetic resin sheets that no adequate technical suggestions can be gleaned for the mounting of flexible synthetic resin sheets from this prior art. This also holds true for the clamping device known from German Utility Model No. 7,402,217 which serves for holding a sheet at a certain spacing from a planar, large-area substrate. However, in this conventional installation, the process of penetration must be effected by means of a part having the shape of a tubular cylinder. Utilization of this device for a detachable mounting of blister-style sheets is impossible, if only for the reason that when establishing the connection, damage to the material cannot be avoided, which in certain cases reduces the usefulness of the device, after formation of the connection, to zero.

More suitable are the other known installations of this type, for example as shown in German Pat. No. 2,642,543 and DAS (i.e. German Published Application) No. 2,802,219, consisting of basic molded pieces with a mounting base for pairs of molded members as well as a spike for penetrating the sheet and with molded attachment elements which can be releasably connected with the molded base members and between which the sheet is pinched. In these conventional installations, the molded base member has a central bearing axle located above the clamping surface and extending in the upward direction, this axle being pointed at its upper, free end to form the spike and exhibiting a locking means cooperating with a corresponding means on the molded attachment member fashioned as a sleeve and triggering the clamping step when the sleeve is placed on the spike and the pair of molded members is connected by turning the locking means. Although the mounting of the sheet with these conventional devices is firm and secure, the procedure is expensive and very tiring for the workers, in that the numerous pairs of molded members required for the insulation of large-area windows or roofs must be fastened by a turning motion by hand, which is done with the index finger and thumb, and the unlocking process is even more fatiguing and paralyzing for one's fingers.

It is an object of the invention to improve devices of this type so as to render the working step during the joining together and unlocking operations easier and less tiring for the operator, while retaining the previous advantages.

To attain this object, the constructional features described hereinafter are provided according to this invention.

The previously-described prior art cannot make the invention obvious to one skilled in this art, for the following reasons:

The constructional principle of the invention, starting with the prior art to be improved, according to DAS No. 2,802,219, could not readily be solved, and could not be attained without inventive ingenuity. This is so, because to achieve this development, the prior art does not contain any corresponding suggestions. Insofar as conventional constructional features were utilized in solving the problem, as known from German Pat. No. 2,642,543; German Utility Model No. 7,402,217; DOS No. 2,456,505; and German Utility Model No. 7,518,031, the invention is not obvious from the prior art, because in the latter the technical conditions are too remote from this invention to make its construction obvious. In particular, it is not obvious to replace the mounting and rotational locking, utilized heretofore by those skilled in the art for the clamping attachment, taking place in a direction perpendicular to the sheet to be connected by clamping, by a mounting which is effected in a direction parallel to the sheet to be connected by clamping.

This invention makes it possible to provide a device for the clamping together and detachable mounting of synthetic resin sheets which is just as readily producible as the devices of this type known heretofore, but which requires in conducting the locking step and the subsequent unlocking step substantially simpler and labor saving manipulations than has heretofore been the case. In the finished assembly, in mounted condition, the device provides a clamping in place of the sheets which is firm and secure and effects a satisfactory mounting of the sheets.

The features of the invention and the advantages thereof can also be seen from the following description of various embodiments, taken in conjunction with the accompanying drawings, wherein:

FIG. 1 shows a top view of a base member of a device according to the invention, with a spike;

FIG. 2 shows a side elevation of the base member of FIG. 1;

FIG. 3 shows a top plan view of a slip-on member of a device;

FIG. 4 shows a section along line IV—IV in FIG. 3;

FIG. 5 shows a section along line V—V in FIG. 3;

FIG. 7 shows a lateral view of the device of FIG. 6 with a relatively thick sheet being clamped in between;

Figure 6:
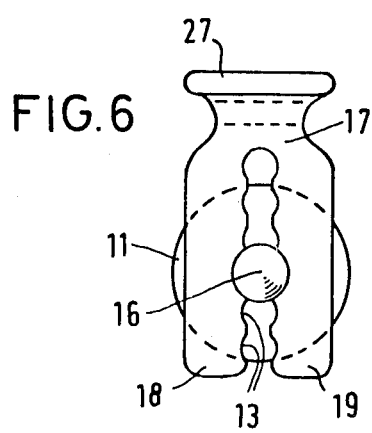
FIG. 6 is a top view from above of a device after being put together, without a sheet.

The pairs of molded members of the clamping device are fashioned as a base part 10 and a slip-on or slide member 20. The sheet 26 is tensioned and clamped and held between the clamping surfaces 25a and 25b of these members (see FIGS. 1, 2, and 4, 5).

The base part 10 has a base plate 11 with which this part is attached to a glass surface or other substrate. Mounting can be effected in any desired, conventional manner by gluing or cementing the base plate 11 to the substrate, or if desired, the base plate 11 can be fashioned as a suction cup for attachment to planar substrates, or it can be prepared for attachment with conventional screws or rivets or like mounting means. The base plate 11 can also be attached to the substrate by way of webs (not shown) of an appropriate length with varying spacings from the respective substrate, optionally by way of an additionally provided bottom plate, as is described, for example, in DAS No. 2,802,219.

The surface 25a of the base plate 11, in the center of which a spike 12 extends axially for penetrating the sheet to be fastened by clamping, constitutes the sheet-clamping surface of the base part 10. This clamping surface can, if desired, be fashioned to be slightly beveled. The spike 12 consists of a cylindrical spike body 14, with an annular flange 15 at the upper end thereof. This flange carries a spike tip 16 tapering in the upward direction. The spike tip 16 can rest, if desired, by means of a shoulder-like transition section (not shown) on the flange 15. Such a configuration is especially advantageous if relatively thick blister sheets or air-cushion pads must be penetrated when mounting the sheet. In this case, the spike tip 16 can be fashioned with a relatively small apex angle so that penetration is facilitated, without constructing the neck of the tip seated on the flange 15 to be longer than suitable whilst the flange 15 has a diameter which is suitably not too large as compared with the spike body 14, namely a diameter which is enlarged by about one-third. It has been found that such a transition section can be omitted if, with an apex angle of the spike tip 16 of 60°, the annular flange 15 has an outer diameter of about 9 mm and the spike body 14 has a cylinder diameter of about 6 mm, which has proven to be practical for most uses.

The slip-on member 20 (see FIG. 3) consists of a two-legged, U-shaped clamping fork 17 with the fork legs 18 and 19 arranged in parallel to each other with a mutual spacing of a. The length of the fork legs 18 and 19 is suitably selected to be somewhat greater than the diameter of the base plate 11 of the base part 10, and the height of the fork leg body is maximally dimensioned in correspondence with the height of the spike body 14. For saving material, and depending on the type of material and optimum elasticity of the fork legs 18 and 19, it may be advantageous to make the bodies of the fork legs of a lesser thickness and to fashion them with correspondingly dimensioned, downwardly projecting ridges 21 and 22 (see FIG. 5), the lower bottom surfaces of which constitute the clamping surfaces 25b of the slip-on member 20. The ridges 21 and 22 can be constructed (see FIG. 4) in such a way that their height becomes smaller toward the front end and thus the lower surfaces 25b are slightly beveled or slightly faired upwardly. This facilitates the attachment of relatively thick sheets, especially those with molded-in air cushions or blisters.

The inner lateral surfaces 23 and 24 of the fork legs 18 and 19 have arcuate pair-wise opposed recesses 13 into a selected pair of which locks the spike body 14 when the clamping fork 17 is slipped onto the base plate 11 and/or the sheet 26 lying thereon. The fork legs 18 and 19, with these recesses 13 arranged on the insides thereof, thus serve as a locking means (see FIGS. 6-9), the least mutual spacing thereof, denoted by a, being somewhat less than the outer diameter of the spike body 14, so that when the slip-on member 20 is placed on the base part 10, the fork legs 18 and 19, due to a certain elastic expansion of their inner spacing, slide under pretensioning along the outer periphery of the spike body 14, and when the clamping surfaces 25b rest on the sheet 26, the spike body 14 locks into the closest recesses 13. Of course, it is also possible to fashion the device for a specific sheet thickness only, with only one mutually opposed pair of recesses 13 in the fork legs 18 and 19.

However, for general usage it is advantageous to provide several pairs of recesses 13 spaced in a series as shown, for example, in FIG. 3, and to adjust during the individual assembly operation the grip of the tensioned mounting by a more or less extensive advancement of the slip-on member 20 along the base part 10.

Figure 8:
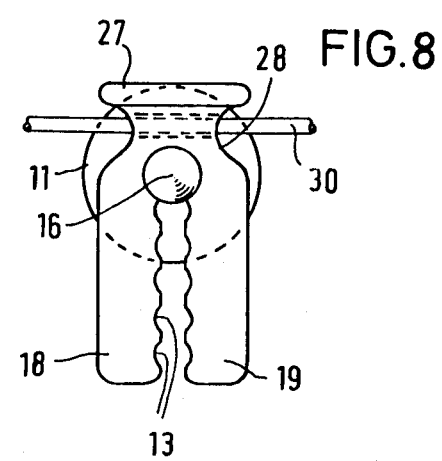
FIG. 8 shows another embodiment of a device after being put together, without a sheet, with cord material being inserted.
Figure 7:
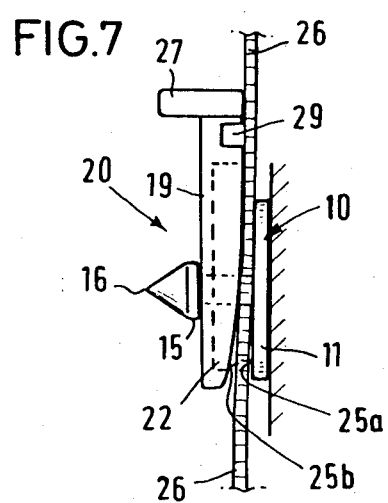
Figure 9:
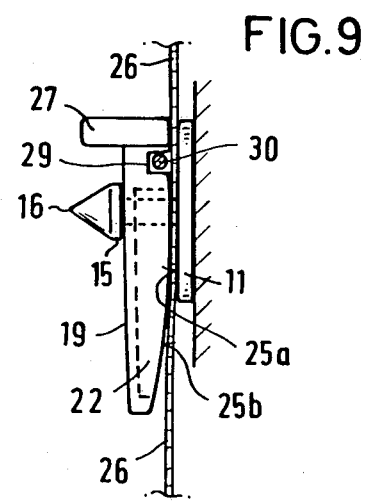
FIG. 9 is a lateral view of the device of FIG. 8 with a relatively thin sheet clamped therein.

Suitably, the slip-on member 20 has a handle 27 at the clamping fork 17, facilitating manipulation, and between the handle and the extension of the fork legs 18 and 19, a recess 29 can be provided in the lower portion of the neck 28 of the fork to accommodate a cord 30 (see FIGS. 8 and 9). Such cords which can comprise, for example, cables or strings or also plastic cord or plastic-coated wire or the like, can in this way be mounted simultaneously with the insulating sheet and held in place, and can serve as hanging elements for the temporary attachment of other materials, for instance additional textile covers, awnings, or as an additional mounting means for the plastic sheet, for example if a relatively thin sheet is provided which is to be attached with a relatively small number of pairs of molded members per unit area. This can be advantageous, for example, if there is a lack of suitable substrate for the gluing or cementing or other attachment of the base parts 10, or if the substrate is limited, for example if interspaces between glass roofs are to be covered or bridged by means of the insulating sheet to be attached to the glass roofs.

The pairs of molded members of the device can be made of any desired material useful for this purpose, such as, for example, a synthetic resin material, e.g. nylon, polypropylene, polyvinyl chloride, acrylonitrile plastics, or ABS resin. They are utilized by simply attaching the sheet over the spike tips of the mounted base parts and laterally slipping on the slip-on member in parallel to the surface of the sheet.

What is claimed is:

1. In a device for the detachable mounting of flexible sheets, comprising a plurality of molded members of synthetic resin, connectible in pairs with each other, clamping the sheet between them, wherein one molded member is adapted to be attached as the base part to a substrate and the other molded member can be detachably mounted on the base part, and wherein a spike for passing through the sheet extends from a base plate of the base part; the improvement in which the spike has a cylindrical spike body and an annular flange carrying a conical spike tip, and the other molded member is a slip-on member comprising a two-legged clamping fork, the fork legs of which are secured together at one end and spaced apart at the other end and have a least spacing from each other which is somewhat less than the outer diameter of the spike body, the inner lateral surfaces of said fork legs having at least one recess wherein the spike body locks into place when the legs of the clamping fork are slid lengthwise between said flange and said base plate with said legs straddling said spike body.

2. Device according to claim 1, in which several recesses are provided which are located in side-by-side relationship along at least one said leg.

3. Device according to claim 1, in which the fork legs taper in longitudinal section toward their forward free ends, the lower bottom surfaces of these fork legs, which come to rest on the sheet to be clamped in place, being beveled or slightly arcuate.

4. Device according to claim 1, in which the fork legs have ridges the height of which decreases toward the forward free ends of the fork legs, the lower bottom surfaces of these fork legs, which come to rest on the sheet to be clamped in place, being beveled or slightly arcuate.

5. Device according to claim 1, in which the slip-on member has a handle at the clamping fork, and a recess is provided between the handle and the extension of the fork legs in the fork neck, for accommodating a cord.

6. Device according to claim 1, in which there are a plurality of said recesses arranged in at least one pair of confronting recesses one in each said leg.

7. Device according to claim 6, there being a plurality of said pairs of recesses disposed along the length of said legs.

* * * * *